N. C. VAN OTTEREN.
BOTTLE AND TICKET HOLDER.
APPLICATION FILED SEPT. 9, 1907.

917,914.

Patented Apr. 13, 1909.

Witnesses
Vernon J. Lilly.
Georgiana Chace

Inventor
Neal C. Van Otteren
By Luther V. Moulton
Attorney

UNITED STATES PATENT OFFICE.

NEAL C. VAN OTTEREN, OF GRAND RAPIDS, MICHIGAN.

BOTTLE AND TICKET HOLDER.

No. 917,914.　　　　Specification of Letters Patent.　　　Patented April 13, 1909.

Application filed September 9, 1907. Serial No. 391,993.

*To all whom it may concern:*

Be it known that I, NEAL C. VAN OTTEREN, a citizen of the United States of America, residing at Grand Rapids, in the county of Kent and State of Michigan, have invented certain new and useful Improvements in Bottle and Ticket Holders; and I do hereby declare the following to be a full, clear, and exact description of the invention, such as will enable others skilled in the art to which it appertains to make and use the same.

My invention relates to improvements in bottle and ticket holders and more particularly to devices for use in vending milk and cream put up in bottles for delivery to purchasers.

Figure 1:
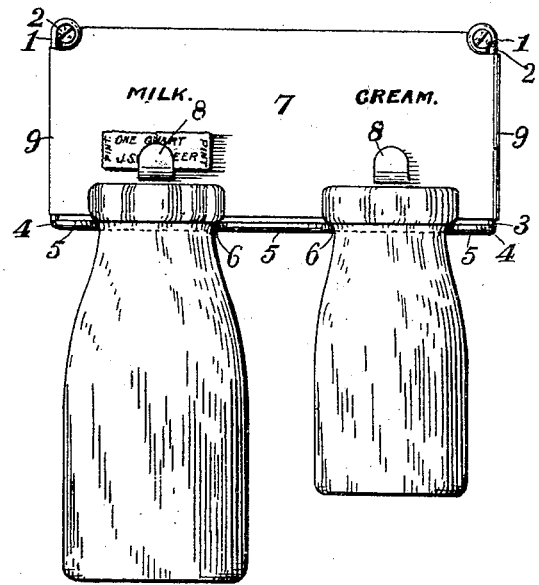
Figure 2:
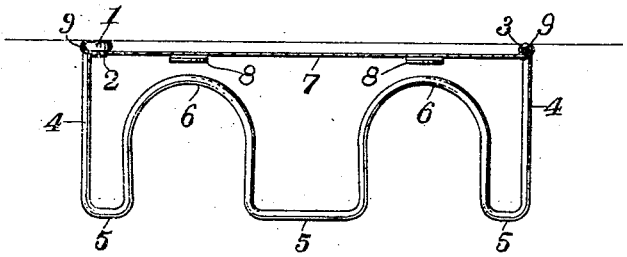
Figure 3:
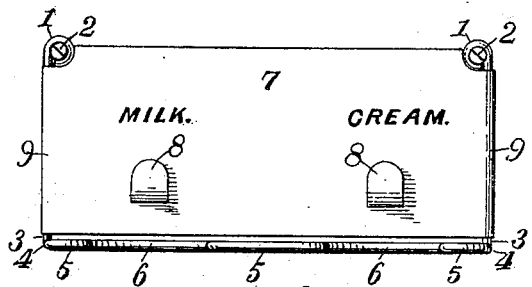

The object of my invention is to provide a device conveniently adapted for holding milk bottles of the usual construction, and also adapted for holding the usual milk tickets used by milk venders; to provide a simple, cheap and effective device for the purpose; and to provide the same with various new and useful features hereinafter more fully described and particularly pointed out in the claims, reference being had to the accompanying drawings, in which:

Figure 1. is a front elevation of a device embodying my invention with a ticket and bottles inserted therein; Fig. 2. a plan view of the device alone; and Fig. 3. a front elevation of the same.

Like numbers refer to like parts in all of the figures.

The bottle holding member of the device consists essentially of a single piece of wire having a loop 1 formed in each end thereof in which loops are inserted screws to attach the device to any convenient support. This wire extends vertically downward from each of said loops as at 3 and at the bottom of the vertical portions 3 extends horizontally outward a suitable distance, and is thence extended horizontally and at a distance from the plate as at 5 and provided in the horizontal portion with inwardly extended loops 6, each adapted to engage the neck of a milk bottle and suspend the same therein. The vertical portions 3 of the wire are connected and rigidly held in parallel relation by a plate of sheet metal 7, folded around the wire as at 9, said plate also having struck up therein clips 8 for holding the milk tickets. This sheet metal also provides a suitable surface on which may be inscribed or printed suitable words such as "Milk" and "Cream" located above the respective clips to indicate which is wanted by the customer. Also on this plate may be placed any other reading matter as occasion may require.

What I claim is:

A combined bottle and ticket holder, consisting of a wire having a loop at each end, and thence extending downward vertically, and having side portions extending outward horizontally from the lower ends of the vertical portions, and also having a middle front portion provided with horizontally disposed loops each loop adapted to engage the neck of a bottle, and a plate having its ends folded around the respective vertical portions of the wire and supported thereby, and also having a clip struck up above each loop, to hold a milk ticket.

In testimony whereof I affix my signature in presence of two witnesses.

NEAL C. VAN OTTEREN.

Witnesses:
　W. S. STILWELL,
　CHAS. E. PHILLIPS.